United States Patent [19]

Hubscher

[11] Patent Number: 5,170,545
[45] Date of Patent: Dec. 15, 1992

[54] SCREWGUN SAW ADAPTOR

[76] Inventor: Darin W. Hubscher, RR #2, Swan River Mb. R0L 1Z0, Canada

[21] Appl. No.: 795,013

[22] Filed: Nov. 20, 1991

[51] Int. Cl.$^5$ ............................................. B23B 45/00
[52] U.S. Cl. ....................................... 29/26 A; 7/158; 408/16; 408/241 R
[58] Field of Search .................. 29/26 A; 408/16, 20, 408/124, 239 R, 241 R; 144/1 F; 7/158; 279/144, 145

[56] References Cited

U.S. PATENT DOCUMENTS

| | | | |
|---|---|---|---|
| 2,777,340 | 1/1957 | Hettwer et al. | 408/124 |
| 3,096,798 | 7/1963 | Pupsley | 144/1 R |
| 3,274,889 | 9/1966 | Ferris | 409/182 |
| 3,484,114 | 12/1969 | Rodin | 279/144 |
| 3,759,336 | 9/1973 | Marcovitz et al. | 279/144 |

Primary Examiner—Daniel W. Howell
Attorney, Agent, or Firm—H. Jay Spiegel

[57] ABSTRACT

An adaptor is disclosed which is designed to be attached to an existing screwgun having a bit with a polygonally shaped end. The adaptor has a recess designed to drivingly receive the hexagonally shaped end of the bit and may be fixedly attached to the existing screwgun. The adaptor has gearing designed to allow rotation of a tool receiving adaptor at a much greater speed than the input speed. A saw blade may be attached to the tool receiving adaptor so that the inventive screwgun saw adaptor may be employed to convert a screwgun into a sawing device. In one embodiment of the present invention, an electrical circuit is incorporated into the adaptor which allows determination of the location of an electrical box behind a wall, which device includes a sensor and an indicator.

10 Claims, 1 Drawing Sheet

SCREWGUN SAW ADAPTOR

BACKGROUND OF THE INVENTION

The present invention relates to a screwgun saw adaptor. The following prior art is known to Applicant:
  Canadian Patent 221,357 to Sweetland
  Canadian Patent 394,767 to Toop
  Canadian Patent 674,260 to Belanger
  Canadian Patent 847,647 to Cordone et al.
  U.S. Pat. No. 3,096,798 to Pugsley
  U.S. Pat. No. 3,274,889 to Ferris.

Each of these patents discloses a powered tool, however, none of these references teaches the combination of an adaptor having both a tool and a metal locating device.

SUMMARY OF THE INVENTION

The present invention relates to a screwgun saw adaptor. The present invention includes the following interrelated objects, aspects and features:

(A) In a first aspect, the inventive device has a coupling mechanism allowing the device to be attached to an existing screwgun. In a first embodiment of the coupling mechanism, a V-shaped groove is provided in a recess which groove is designed to receive an expanded metal ring on the existing screwgun. An elongated passageway through the middle of the adaptor is provided which leads to a coupling recess having internal walls, for example, hexagonally shaped, to allow enmeshing with the outer shape of a bit attached to the existing screwgun. In a second embodiment, the structure including the V-shaped groove is replaced with a threaded coupler designed to be threadably received on exterior threaded surfaces of the existing screwgun.

(B) Gearing is provided in the adaptor including a relatively large gear drivingly connected to a fitting having the coupling recess, above-described, incorporated therewith. The relatively large gear is enmeshed with a relatively small gear drivingly connected to an elongated shaft having a tool adaptor mounted thereon designed to receive coupling structure on a tool such as, for example, a saw blade. With this configuration of parts, rotation of the bit of the existing screwgun as inserted within the coupling recess of the fitting will cause rotations of the first mentioned gear which result in rotations of the second mentioned gear and, along therewith, rotations of the saw blade.

(C) In a further aspect, the inventive adaptor has contained within the housing thereof an electrical circuit including a metal sensor, an indicator and a battery, as well as an on-off switch. When the electrical circuit is activated, the indicator will light when the housing is placed in close proximity to a metallic box such as one which would be contained in a wall behind existing drywall. In this way, the electrical circuit may be employed to locate an electrical box behind drywall and the inventive screwgun saw adaptor may be activated to allow sawing through the drywall to expose the electrical box.

As such, it is a first object of the present invention to provide a screwgun saw adaptor.

It is a further object of the present invention to provide such a device including a saw blade removably attachable thereto and rotatable in response to movements of a screwgun bit to allow sawing of materials.

It is a still further object of the present invention to provide such a device including an electrical circuit designed to allow location of metallic objects such as for example, an electrical box hidden behind an existing wall.

These and other objects, aspects and features of the present invention will be better understood from the following detailed description of the preferred embodiments when read in conjunction with the appended drawing figures.

SPECIFIC DESCRIPTION OF THE PREFERRED EMBODIMENTS

Figure 1:
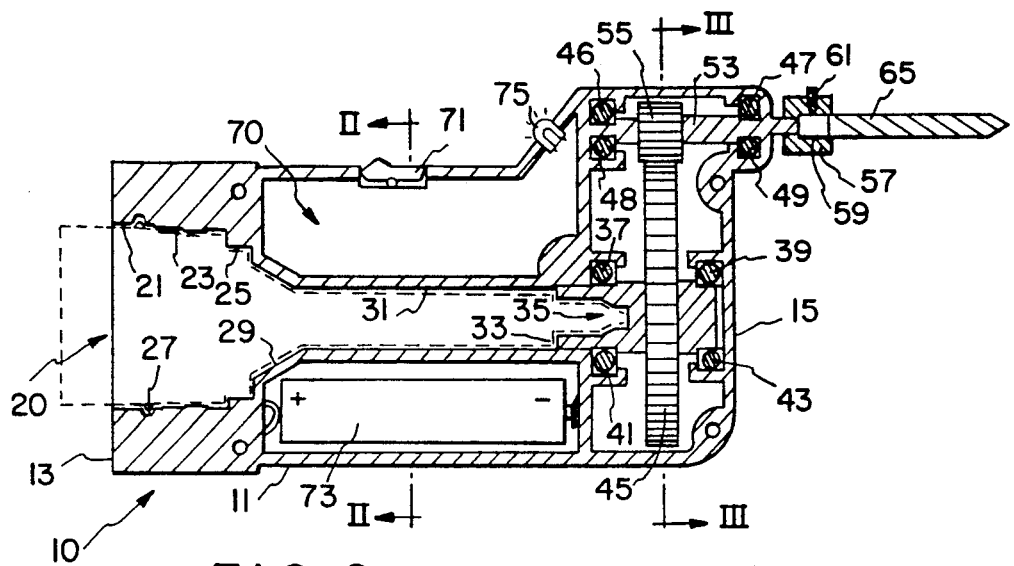
FIG. 1 shows a side view of the present invention with portions broken away to show detail.
Figure 2:
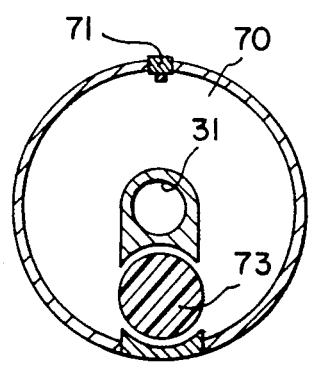
FIG. 2 shows a cross-sectional view along the line II—II of FIG. 1.
Figure 3:
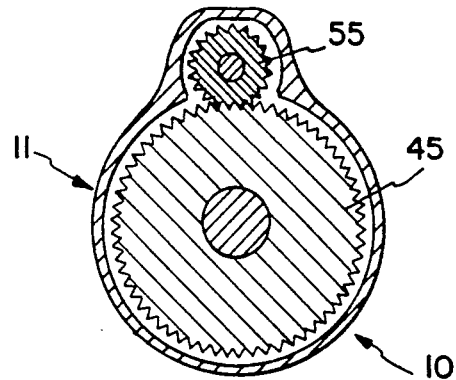
FIG. 3 shows a cross-sectional view along the line III—III of FIG. 1.

With reference, first, to FIG. 1, the inventive device is generally designated by the reference numeral 10 and is seen to include a housing 11 having a first end 13 and a second end 15. The first end 13 includes a coupling mechanism generally designated by the reference numeral 20 and including a series of stepped surfaces 21, 23 and 25 with the surface 21 having a V-shaped groove 27. Adjacent the stepped surface 25 is a generally frustroconical surface 29 which leads to an elongated bore 31 having an end remote from the surface 29 in which is inserted a fitting 33. The surfaces 21, 23, 25 and 29 are sized and configured to receive corresponding external surfaces on an existing screwgun (shown in phantom). The elongated bore 31 is sized and configured to allow a tool bit removably affixed to the existing screwgun to freely rotate therein. The V-shaped groove 27 is sized and configured to removably receive an expanded metal ring (not shown) on the existing screwgun to allow coupling of the housing 11 to the existing screwgun.

The fitting 33 has a recess 35 therein which has inner surfaces designed to enmesh with corresponding outer surfaces on the end of the above-described bit. In one example, the recess 35 may have a generally hexagonal cross-section designed to enmesh with the hexagonal outer surface of the end of the bit. In this way, with the existing screwgun inserted within the surfaces 21, 23, 25, 29, within the V-shaped groove 27 and with the bit inserted through the bore 31 and coupled within the recess 35 of the fitting 33, rotational movements of the bit will translate to corresponding rotational movements of the fitting 33.

Figure 4:
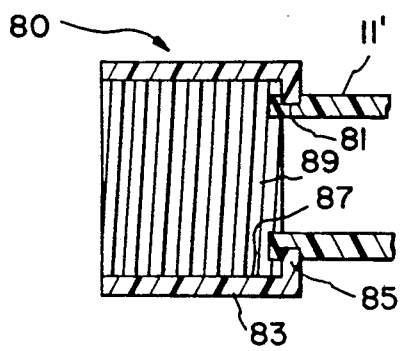
FIG. 4 shows a cross-sectional view through a second embodiment of coupling mechanism in accordance with the teachings of the present invention.

With reference to FIG. 4, a further embodiment of coupling mechanism is disclosed which may be used in accordance with the teachings of the present invention in place of the coupling mechanism 20 illustrated in FIG. 1. In FIG. 4, like structures are designated using like primed reference numerals. Thus, the housing 11' is seen to have an annular groove 81 designed to rotatably receive a radially inwardly directed protrusion 85 of a ring 83 having interior walls 87 with screw threads 89 therein. The screw threads 89 are sized and configured to enmesh with corresponding external threads on an adaptor surface of an existing screwgun. Thus, the housing 11' may be suitably installed on the existing screwgun through rotative movements of the ring 83 with respect to the housing 11'.

As shown in FIG. 1, the fitting 33 is carried by bearings 37 and 39 which are respectively retained in position by bearing housings 41 and 43 which form a part of the internal structure of the housing 11. Drivingly attached to the fitting 33 is a first large gear 45 which is enmeshed with a second smaller gear 55 which is drivingly connected on a shaft 53 supported on bearings 46 and 47 which are mounted in respective bearing housings 48 and 49 in the housing 11.

The shaft 53 extends outside the housing 11 and has a tool adaptor 57 attached thereto which has a recess 59 designed to receive a tool 65 as well as a set screw 61 which is designed to allow locking of the tool 65 in a mounted position in the adaptor 57.

As should be understood from the above description, when the bit of an existing screwgun is inserted through the bore 31 with the end of the bit inserted within the recess 35, rotations of the bit through operation of the screwgun will result in rotations of the bit 65 at a much greater rate of speed than rotation of the screwgun bit due to the gear ratio between the gears 45 and 55 which, in the preferred embodiment, is at least 8:1.

In the preferred embodiment of the present invention, the bit 65 consists of a saw which may be used to cut through drywall to cut an opening at a location where a metallic electrical box was previously installed with the drywall installed thereover. In this regard, it is desirable to provide a means which will allow location of the metallic electrical box behind the drywall so that the drywall may be cut in the appropriate location.

Figure 5:
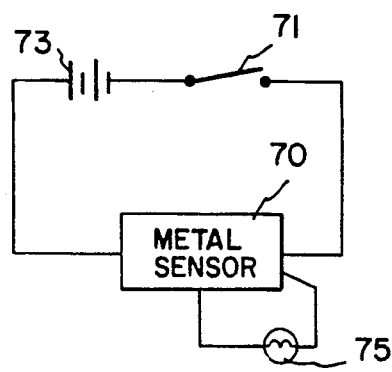
FIG. 5 shows a schematic representation of the electrical circuitry of the present invention.

In this regard, the present invention also includes electronics provided for this purpose. As shown in FIG. 1, the electronics are generally designated by the reference numeral 70 are mounted within the housing 11 in adjacency with the bore 31. The housing 11 also includes an on-off switch 71, a battery 73 and an indicator light 75. These components are also schematically shown in FIG. 5.

Metal sensors per se are known and the particular metal sensor which is employed may be any desired design so long that it may be made small enough to fit within the space provided within the housing 11. In the use of the electronics, when the housing 11 is placed in adjacency with a wall surface and the switch 71 is closed, when metal is sensed such as, for example, a metal electrical box hidden behind drywall, the indicator light 75 will illuminate so that the user will know where sawing operations are required. In this way, the present invention may be used to locate a hidden metal electrical box and to saw through the drywall hiding the box to expose it.

As such, an invention has been disclosed in terms of preferred embodiments thereof, which fulfill each and every one of the objects of the invention as set forth hereinabove and provides a new and improved screwgun saw adaptor of great novelty and utility.

Of course, various changes, modifications and alterations in the teachings of the present invention may be contemplated by those skilled in the art without departing from the intended spirit and scope thereof. As such, it is intended that the present invention only be limited by the terms of the appended claims.

I claim:

1. An adaptor device, comprising:
   a) a housing having a coupling mechanism including a coupling recess connected to an elongated bore;
   b) said housing having a first relatively large gear drivingly mounted on a fitting, said fitting including a proximal portion located in adjacency to a distal end of said elongated bore, said proximal portion having a drive recess facing said coupling recess;
   c) a second relatively small gear enmeshed with said first gear and drivingly mounted on a shaft having a distal end extending outside said housing, said shaft distal end having a tool adaptor thereon; and
   d) said housing containing a metal sensing device including a sensor and an indicator for indicating when an adjacent metallic object has been sensed.

2. The invention of claim 1, wherein said fitting is rotatably mounted on bearings.

3. The invention of claim 1, wherein said coupling mechanism includes a V-shaped groove.

4. The invention of claim 1, wherein said coupling mechanism includes a threaded surface.

5. The invention of claim 1, wherein said gears define a gear ratio of 8:1.

6. The invention of claim 1, wherein said proximal portion of said fitting protrudes into said distal end of said bore.

7. The invention of claim 6, wherein said drive recess has a hexagonal cross-section.

8. The invention of claim 1, wherein said indicator comprises a light.

9. The invention of claim 1, wherein said metal sensing device has an on-off switch, and is battery powered.

10. The invention of claim 1, wherein said coupling mechanism is sized and configured to couple with corresponding structure of a screwgun.

* * * * *